(12) United States Patent
Sakamoto et al.

(10) Patent No.: US 7,194,926 B2
(45) Date of Patent: Mar. 27, 2007

(54) METHOD OF CHANGING GEARS OF AUTOMOBILE, AUTOMOTIVE GEAR SHIFTER, CONTROLLER FOR AUTOMOTIVE GEAR SHIFTER, AND ACTUATOR CONTROLLER FOR AUTOMOTIVE GEAR SHIFTER

(75) Inventors: Hiroyuki Sakamoto, Hitachinaka (JP); Masahiko Ibamoto, Hitachinaka (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 246 days.

(21) Appl. No.: 10/960,288

(22) Filed: Oct. 8, 2004

(65) Prior Publication Data

US 2005/0115346 A1 Jun. 2, 2005

(30) Foreign Application Priority Data

Oct. 10, 2003 (JP) ............................. 2003-351474

(51) Int. Cl.
*F16H 59/00* (2006.01)

(52) U.S. Cl. ........................................ 74/335

(58) Field of Classification Search ................... 74/335
See application file for complete search history.

(56) References Cited

U.S. PATENT DOCUMENTS

| 6,898,992 B2 * | 5/2005 | Koenig et al. ............... 74/335 |
| 6,935,204 B2 * | 8/2005 | Walker et al. ................ 74/335 |
| 6,951,149 B2 * | 10/2005 | Yamamoto et al. ........... 74/335 |
| 2003/0019313 A1 | 1/2003 | Ibamoto |

FOREIGN PATENT DOCUMENTS

JP 6-221427 * 8/1994 ................. 74/335

* cited by examiner

*Primary Examiner*—Ha Ho
(74) *Attorney, Agent, or Firm*—Crowell & Moring LLP (57) ABSTRACT

To enable compactness by lowering the connecting force of dog clutch so as to decrease the energy consumption and reduce the size of a system. A method of changing gears of automobile which moves the dog clutch in the axial direction at the time of gear change, while applying weak periodic torque vibration between the gear of the dog clutch and change gear of the gear shifter, and disconnects the two gears and, after the gear of the dog clutch and change gear of the gear shifter have been disconnected, also moves the dog clutch in the axial direction, while applying weak periodic rotating speed vibration between the gear of the dog clutch and another change gear of the gear shifter, and connects the two gears.

6 Claims, 9 Drawing Sheets

METHOD OF CHANGING GEARS OF AUTOMOBILE, AUTOMOTIVE GEAR SHIFTER, CONTROLLER FOR AUTOMOTIVE GEAR SHIFTER, AND ACTUATOR CONTROLLER FOR AUTOMOTIVE GEAR SHIFTER

FIELD OF THE INVENTION

The present invention relates to a method of changing gears of automobile, automotive gear shifter, controller for automotive gear shifter, and actuator controller for automotive gear shifter.

BACKGROUND OF THE INVENTION

An automotive gear shifter for changing and transmitting the drive torque from prime mover to wheel via multiple change gears by shifting the change gears with a dog clutch comprises a gear train connected with the prime mover side (installed on the input shaft of the gear shifter) and gear train connected with the wheel side (installed on the output shaft of the gear shifter) and changes the speed of the wheel by selectively shifting and connecting the gears of the dog clutches connected with each change gear train (hereinafter simply called the dog clutch) so as to change the gear ratio of the gears of the gear shifter.

There is also available a gear change system in which a bypass transmission path for transmitting driving force is provided and so gear change is operated without interrupting the transmission of the driving force from the input shaft to the output shaft (for example, refer to the Patent Document 1: International Laid-Open Publication WO 01/66971)

Because the gear change according to a prior art is to shift and connect the input shaft side and output shaft side gears of a gear change system by a dog clutch, the gears are disconnected by synchronizing the rotation, that is, controlling the relative rotating speed closer so as to be connected with another. In order to shorten the disconnection time in this operation, it is necessary to disconnect the dog clutch while the connecting force of the dog clutch is still intense.

Because the torque transmission is performed by connecting the gears and engaging the corresponding crests and roots of the gears, connecting them in an opposite phase is preferable but controlling the phase accurately is difficult.

Accordingly, even though the phase has not yet become suitable for the connection, an intense connecting force is applied so as to forcedly connect the gears.

Consequently, an intense driving force is needed for disconnecting and connecting the gears, resulting in excessive size and increased energy consumption of the gear shifter.

In addition, at the time of connecting the gears, because the phase is matched compulsively in a transient state where the transmission of the driving force has just begun, a shock is caused to the body of automobile and uncomfortableness is caused to passengers.

In case of the latter gear change system in which the driving force is transmitted via a bypass transmission path at the time of gear change, the primary driving force transmission path is set open and not in use at time of gear change. Accordingly, load applied to a synchronizing device at the time of gear change decreases to some extent. However, because the rotating speed needs to be increased gradually so that the phase of the dog clutch can be matched, rotational variation must be set small. Consequently, the time needed for gear change becomes longer.

If connecting the gears is made possible by a single attempt of matching the phase, because longer time is needed in matching the phase as explained above, the connecting force of a connection system must be made as large as that of the former gear shifter. Consequently, neither making the gear shifter compact nor decreasing the energy consumption can be realized.

SUMMARY OF THE INVENTION

An object of the present invention is to solve the above problems and offer a method of changing gears or gear shifter of automobile or controller for automotive gear shifter that requires less disconnecting or connecting force of a dog clutch at the time of gear change.

The above object of the present invention is achieved on an automatic gear shifter employing dog clutches by moving the change gears of the dog clutch in the axial direction and disconnecting or connecting the dog clutch while vibrating the relative torque or relative rotating speed of the input side and output side of the gear connection system of the dog clutch at the time of disconnecting or connecting each gear of the dog clutch.

To be concrete, on an automotive gear shifter, comprising an input shaft connected with the prime mover for driving automobile, output shaft connected with wheel and gear train for gear change installed on the input shaft, that changes the combination of the dog clutches so as to change the rotating speed, the phase of the dog clutch is controlled by vibrating the axial torque or axial rotating speed of the input shaft at the time of connecting the dog clutch so as to change the relative torque or relative rotating speed of the input side and output side of the dog clutch from/to positive to/from negative.

According to the present invention, since the dog clutch can be connected easily and connection of the dog clutch can be accomplished with small connecting force, it becomes possible to make the gear shifter more compact and decrease the energy consumption.

DESCRIPTION OF THE PREFERRED EMBODIMENTS

An embodiment of the invention is described hereunder, using figures.

Figure 1:
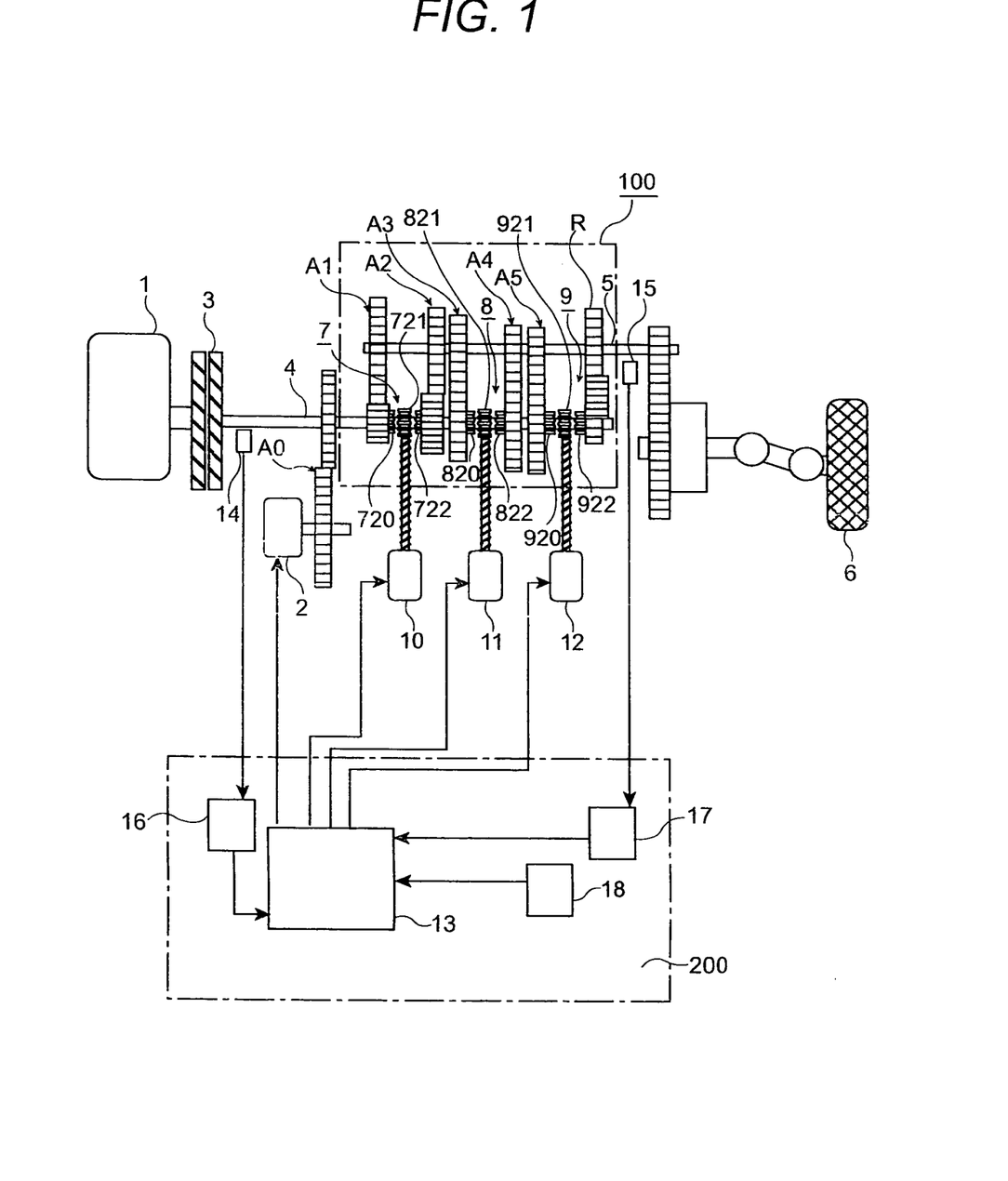
FIG. 1 is an overall system construction of an embodiment of the present invention.

FIG. 1 is an overall system construction of an automotive gear shifter to which the present invention applies.

This system employs multiple dog clutches (simply so-called the dog clutch) 7 to 9 to selectively shift multiple change gear trains (A1: speed 1, A2: speed 2, A3: speed 3, A4: speed 4, A5: speed 5, R: backward) of the gear shifter 100 so as to change and transmit the driving torque from the engine (prime mover) 1 to the wheel 6.

The start clutch 3, which is a friction clutch, is set open when the change gears are connected after the automobile has started or while the gear shifter is in a transient state of gear change so as to keep open the torque transmission path between the engine 1 and input shaft 4 of the gear shifter until connection is complete on any one of the gear trains.

The motor 2 serving as an assist torque supplying device or power unit for the gear change applies necessary toque to the input shaft 4 via the gear train AO while the start clutch 3 is kept open.

FIG. 1 shows a neutral condition.

In a neutral condition, none of the input side engaging rings 721, 821, 921 as input shaft side element of the dog clutches 7 to 9 is connected with any of the output shaft side engaging rings 720 (722), 820 (822), 920 (922). Under this condition, since the input shaft 4 is connected with the engine via the start clutch, they are idling and consequently the input side engaging rings 721, 821, 921 are also idling.

The input side gears of each change gear train are supported capable of rotating on the input shaft 4 and the output side gears are fasted on the output shaft 5. Because of this, neither of the gear trains is rotating in the neutral condition.

When the automobile gets started, the start clutch 3 separates the torque transmission path and so the rotation of the input shaft 4 becomes zero. Under this condition, the connecting force generating device 10 for speed 1-2 gear change (hereinafter called the actuator 10) moves the gear connection system 721 for speed 1-2 gear change as the input side element of the dog clutch 7 (hereinafter called the input side engaging ring 721) in the axial direction towards the output shaft side engaging ring 720 as the output side element of the dog clutch 7.

Since the rotating speed of the input side engaging ring 721 and output shaft side engaging ring 720 is both zero, they can be connected with less connecting force if the phase of the tooth is matched in the rotating direction of both engaging rings. In this embodiment, strong/weak current is applied to the motor 2 under the above condition so as to vibrate the input side engaging ring 721 very slightly in the rotating direction. Accordingly, since the input side engaging ring 721 vibrates very slightly at the time when the input side engaging ring 721 is about to contact the output shaft side engage ring 720 and so an engaging force is about to be generated, the friction resistance between them decreases and so they can be connected smoothly.

When the connection is complete, the start clutch 3 slides slowly and is connected, and thereby the rotating torque (driving torque) of the engine is transmitted to the input shaft 4 and then transmitted to the output shaft 5 via the speed-1 gear train A1. Thus, the wheel 6 rotates and the automobile gets started.

When the accelerator is operated to increase the rotating speed, the gear change for speed 1-2 begins. At first, the start clutch 3 is set open so that the input shaft is separated from the engine. While the rotation of the input shaft is about to start lowering, the motor 2 is driven immediately to assist the driving torque of the input shaft 4 in place of the engine, thereby maintaining the rotation.

Next, the input side engaging ring 721 is moved towards the right in the figure by the actuator 10. If the difference between the rotating speeds of the output shaft side engaging ring 720 and input side engaging ring 721 is big in this operation, an engaging torque acts upon them and consequently the ring 721 cannot be moved towards the right if the operating force of the actuator 10 is weak.

Figure 3:
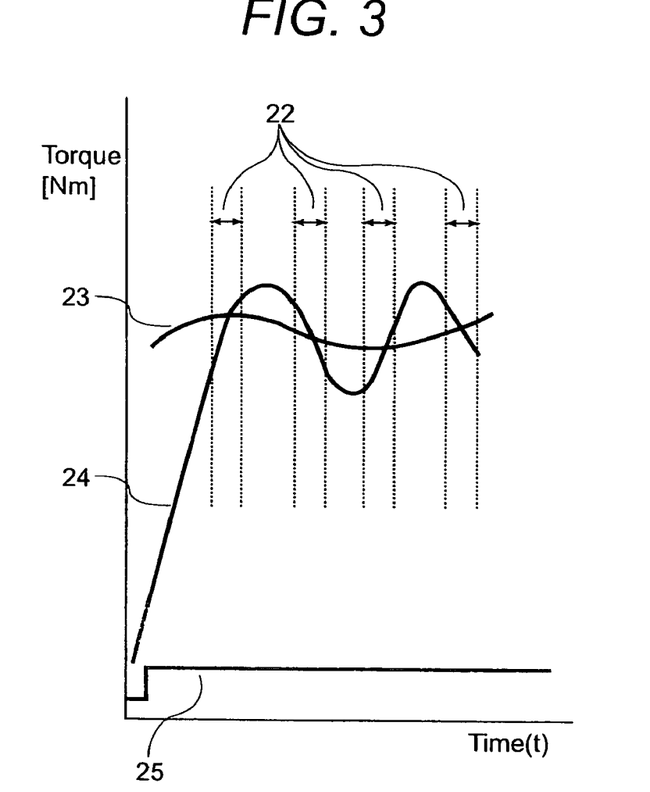
FIG. 3 is a torque waveform of dog clutch.

In this embodiment, current through the motor 2 is so controlled that a torque varying greater or smaller than the output torque 23 of the automobile driving prime mover acting upon the input shaft 4 as shown in FIG. 3 (that is, the input side engaging ring 721 is released from the connection with the output shaft side engaging ring 720 while weak periodic torque vibration is being applied to the rotating torque). With this control, there arises an equilibrium condition (cross point of torques) between the driving torque varying according to the rotating force of the wheel and acting upon the output shaft side engaging ring 720 and the torque from the motor 2 acting upon the input side engaging ring 721. Since no torque is generated between the output shaft side engaging ring 720 and input side engaging ring 721 at this cross point of torque, the input side engaging ring 721 can be moved easily towards the right in the figure even if the power of the actuator 10 is small. If this condition continues several times, the input side engaging ring 721 can be released from the connection with the output shaft side engaging ring 720 easily. Symbol 25 in FIG. 3 represents either connection or disconnection torque.

Thus, the input side engaging ring 721 released from the speed-1 state is further moved to the right by the actuator 10 and begins to get connected with the output shaft side engaging ring 722 of the speed-2 change gear train A2. Under this condition, the motor 2 controls the rotation of the input shaft 4 and matches the rotating speed with that of the output shaft side engaging ring 722 of the speed-2 change gear train A2 (rotational synchronization). When the rotating speeds get closer, the actuator 10 operates the input side engaging ring 721 further towards the right. In this embodiment, when the input side engaging ring 721 becomes closer and about to contact the output shaft side engaging ring 722, the motor 2 connects the input side engaging ring 721 with the output shaft side engaging ring 722 while applying weak periodic rotating speed variation to the rotation of the input shaft 4.

In this embodiment where a control as above is provided, since no big friction resistance is generated even when the input side engaging ring 721 contacts the output shaft side engaging ring 722, connection can be achieved with a small force.

Further, the gear change from speed 3 to speed 4 is controlled in a similar manner as above using the dog clutch 8 and speed-3 change gear train A3 and speed-4 change gear train A4.

The gear change from speed 5 to backward is controlled in a similar manner as above using the dog clutch 9 and speed-5 change gear train A5 and backward change gear train R.

The gear change from speed 2 to speed 3 is controlled in a similar manner as above using the dog clutches 7 and 8 and speed-2 change gear train A2 and speed-3 change gear train A3.

The gear change from speed 4 to speed 5 is controlled in a similar manner as above using the dog clutches 8 and 9 and speed-4 change gear train A4 and speed-5 change gear train A5.

The motor 2 and actuators 10 to 12 are controlled by the actuator controller of the automotive gear shifter. The input and output rotating speeds are calculated by the input shaft rotating speed calculator 16 and output shaft rotating speed calculator 17 based on the signal from the input shaft rotation sensor 14 and output shaft rotation sensor 15, and the result is sent to the controller 13. The controller 13 computes control output to the motor 2 and actuators 10 to 12 based on the input and output rotating speed signals from the input shaft rotating speed calculator 16 and output shaft rotating speed calculator 17 and signal from the vibration generator 18. The actuators 10 to 12 are electromagnetic valves for driving hydraulic valves.

The control unit 200 can be constructed using a microcomputer.

Further detailed embodiment is described hereunder.

The rotation of the engine 1 is sensed by the input shaft rotation sensor 14 via the input shaft 4, and inputted to the input shaft rotating speed calculator 16. The rotation of the wheel is sensed by the output shaft rotation sensor 15 via the output shaft 5, and inputted to the output shaft rotating speed calculator 17. The gear change driving force controller 13 controls the motor 2 based on the output from the vibration generator 18, input shaft rotating speed calculator 16 and output shaft rotating speed calculator 17. The composite torque of the engine 1 and motor 2 is transmitted to each gear via the input shaft 4. The speed 1-2 gear change dog clutch 7, speed 3-4 gear change dog clutch 8 and speed 5-R gear change dog clutch 9, all of which are dog clutch type gear connection system installed for each gear, are driven by the speed 1-2 gear change connecting force generating device 10, speed 3-4 gear change connecting force generating device 11 and speed 5-R gear change connecting force generating device 12. The output shaft 5, to which the driving force is transmitted via each gear change dog clutch, drives the wheel. The clutch 3 is a device that can shut out the output from the engine 1.

When, for example, the gear is shifted to speed 1, the speed 1-2 gear change dog clutch 7 is connected with the speed 1 side and the motor output torque is 0, the driving force of the engine 1 is transmitted to the wheel 6 via the input shaft 4, speed-1 gear and output shaft 5, and the wheel starts rotating.

Then, to drive the car at speed 2, the speed 1-2 change gear dog clutch 7 is shifted from the speed-1 side to the speed-2 side so that the wheel rotates at a rotating speed corresponding to speed 2.

In shifting the 1-2 gear change dog clutch 7 from speed 1 to speed 2, an operation for disconnecting the speed-1 gear and connecting the speed-2 gear is necessary. Because the number of teeth of the gears is different between them, however, it is needed to adjust the rotating speed from the rotation of speed 1 to the rotation ration of speed 2 for the connection. In addition, since a driving torque has applied to the speed-1 gear under the speed-1 state, the gear cannot be disconnected because of the characteristic of the dog clutch. Accordingly, in order to disconnect the speed-1 gear, the following operation is normally performed at first: that is, the clutch 3 is disconnected to set the automobile driving force to zero so that a speed-1 gear disconnecting force is applied to the speed 1-2 gear change dog clutch 7 from the speed 1-2 gear change connecting force generating device 10. However, even if the automobile driving force is set zero by disconnecting the clutch 3, slight driving torque still remains with the speed-1 gear because of inertia moment, and so it is still difficult to disconnect the speed-1 gear instantly with a small disconnecting force. Beside, a similar intense disconnecting force is needed in case the inertia moment of the input shaft 4 is remarkable.

This did not cause a particular problem in a prior art because the disconnecting or connecting force generated by the speed 1-2 gear change connecting force generator 10 was intense. In order to achieve an object of reducing the connecting force in this invention, however, there may be an occasion where the speed-1 gear cannot be disconnected.

If the driving torque of the motor 2 is so applied to the input shaft as to act in the reverse direction of the engine 1, it becomes possible to set the driving toque applied to the speed-1 gear to zero instantly so as to disconnect the speed-1 gear. However, because the load torque of automobile is always varying according to the condition of the automobile, the load torque acting upon the speed-1 gear from the output shaft side cannot be defined even if the driving force (driving torque) is controlled as above. Accordingly, it is difficult to control the transmission torque (that is, driving force+torque opposite to the driving force−load torque) to zero. Furthermore, all types of prime mover do not allow controlling the driving force accurately in many cases.

Figure 2:
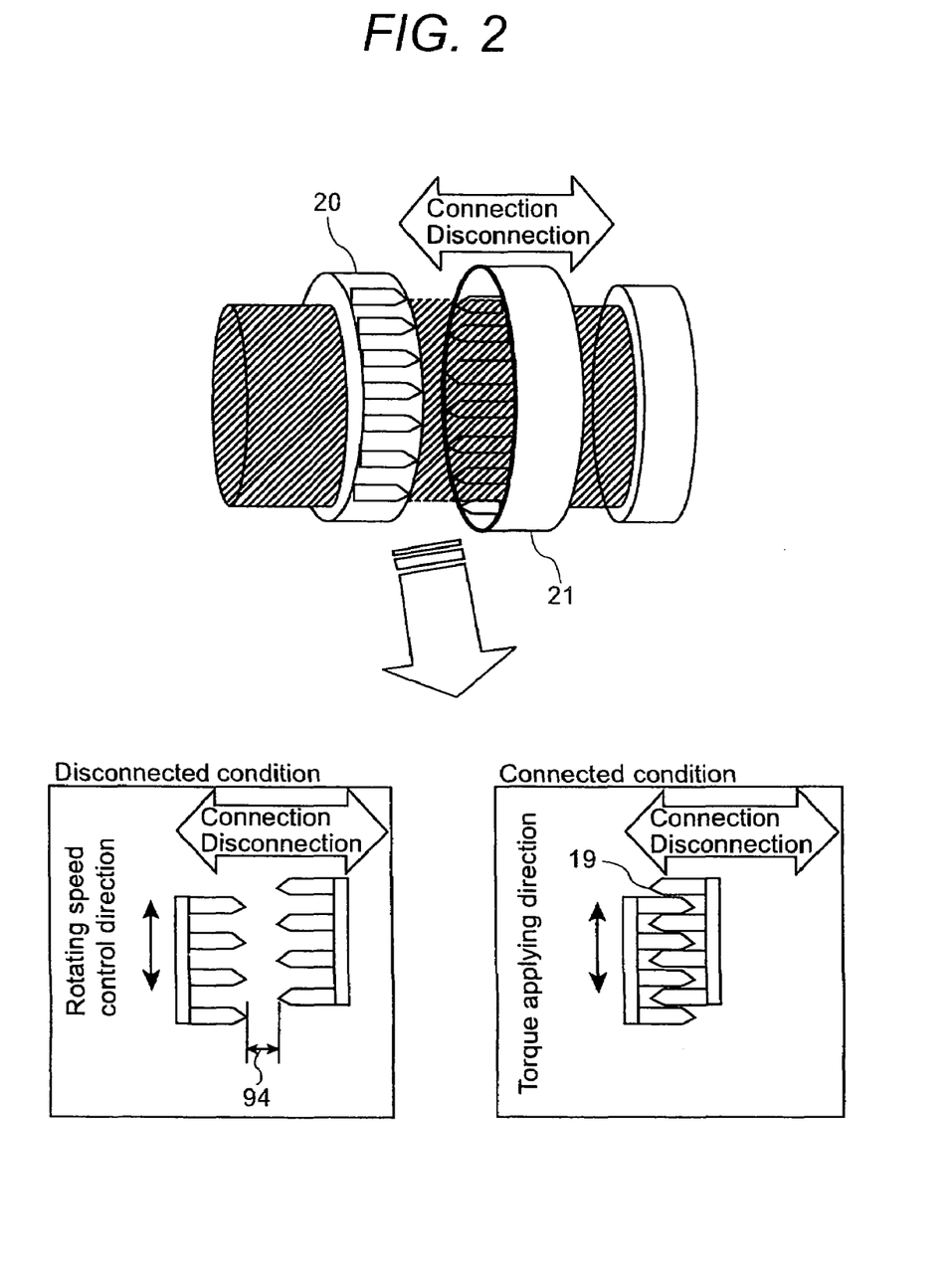
FIG. 2 is a brief view of dog clutch (in torque vibration)

The tooth profile of the connected portion 19 of the dog clutch has little slope except on the tip as shown in FIG. 2, and so the friction resistance between the connected teeth is remarkably big. Accordingly, even though a driving force applied to the gears is very small, there may be a case where the two gears cannot be disconnected easily due to the friction between the connected teeth.

As understood from the above description, the relative torque between the input shaft side and output shaft side of the speed-1 gear can be expressed by an equation below.

Relative torque=Output torque of automobile driving prime mover−Output torque of motor By applying torque vibration shown in FIG. 3 to the connected portion 19 of the dog clutch, a number of cross points 22 where the relative torque applied to the gears becomes zero are generated. Because no force is applied at all to the contact surface of the connected portion 19 at the cross point, the gear can be moved towards the disconnection side shown in FIG. 2 although in a very minute distance. Accordingly, if a number of cross points are generated, the gear can be moved to the disconnection position by a small disconnecting force within a short time.

Figure 4:
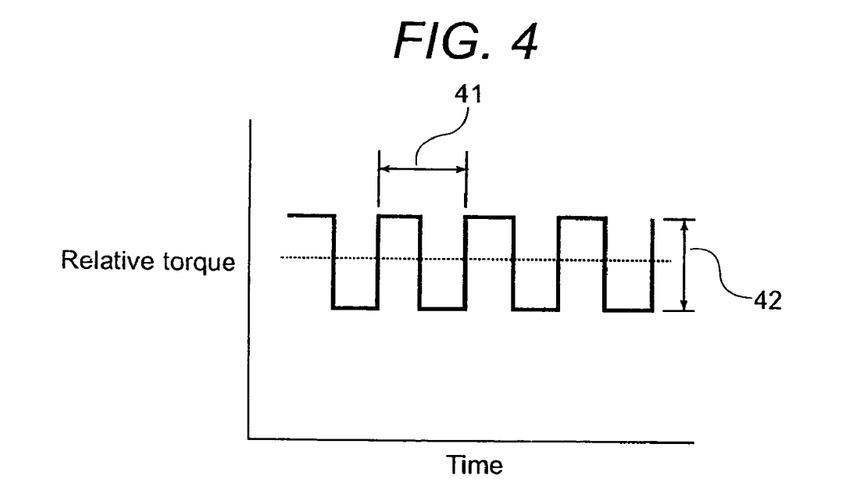
FIG. 4 is a period and amplitude of control torque.

Since this torque vibration controls the applied torque acting upon the gear of the connected portion 19, it is expected that the vibration torque is transmitted to the wheel side if one with wide amplitude is applied and that uncomfortableness is caused to passengers. However, since mechanical connection allowance between the prime mover and wheel attenuates the torque variation to some extent, applying a relatively intense vibration torque would not cause the vibration torque to be transmitted to the wheel side nor cause uncomfortableness to passengers if the frequency of the vibration torque is increased and transmission time of the torque shortened. Accordingly, the amplitude and frequency must be determined to be within the mechanical connection allowance. Since torque is the acceleration of a rotating body, rotating distance is calculated by two-stage integration. If integration time is so set that the rotating distance falls within the mechanical allowance, an inverse of the integration time represents the vibration frequency. Accordingly, if a rectangular wave shown in FIG. 4 is applied as the vibration torque, the rotating distance is calculated by an equation below.

$$x = \tfrac{1}{2} \cdot \alpha/2 \cdot t^2$$

where x: rotating distance (mechanical allowance range)

α: acceleration (amplitude 42)

t: half period (½.period 41=1/(2.frequency)

Since the mechanical allowance range is constant, the relationship between the amplitude and frequency is expressed by an equation below.

$$\alpha = 16 \cdot x \cdot f^2$$

where f: frequency

Figure 5:
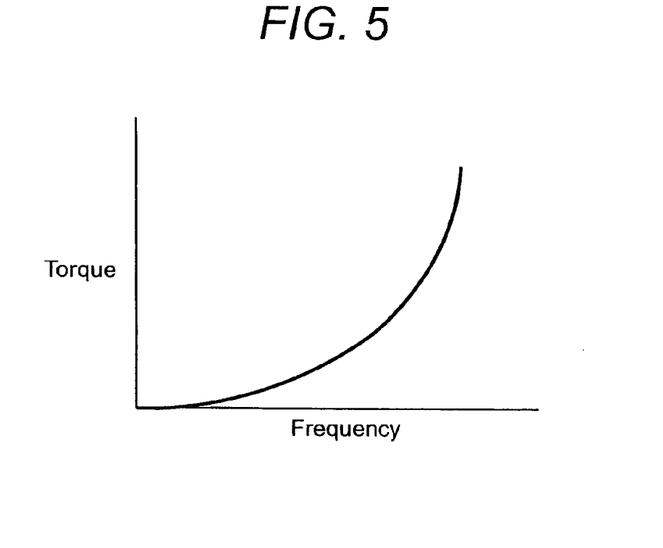
FIG. 5 is a torque-frequency curve.

Accordingly, the relationship between the amplitude and frequency is expressed as shown in FIG. 5. If α and t are so determined that ½·α/2·t² is smaller than x, vibration can be applied to the dog clutch without causing uncomfortableness to passengers.

The above-mentioned vibration control of the torque is effective in case the connection of gears is not deep enough in the connected state and they must be connected further tightly.

Vibrating the torque as employed in this invention requires a power unit with high response, and this requirement can be easily met by using an electric motor and varying the current. When it is employed, observing the current enables to ensure that the control of the present invention is performed in an appropriate manner.

To change from speed 1 to speed 2, the speed-2 gear must be connected next. Immediately after the speed-1 gear is disconnected, the rotating speed can be varied because the prime mover side is not connected with the wheel side. Normally, the rotating speed of the prime mover side that has been rotating at the rotating speed corresponding to speed 1 is adjusted to the rotating speed corresponding to speed 2, and then the dog clutch is connected. Simply by setting the rotating speed closer to the rotating speed corresponding to speed 2, however, the clutch cannot be connected if the phase does not match. In this invention, this problem can be solved by vibrating the relative rotating speed of the input shaft side and output shaft side of the dog clutch.

To apply vibration to the relative rotating speed, the target rotating speed must be changed first. The rotating speed of the input shaft side and output shaft side can be sensed by the input shaft rotating speed calculator 16 and output shaft rotating speed calculator 17 as shown in FIG. 1. The relative rotating speed is calculated as "input shaft rotating speed−output shaft rotating speed". The target is set as the equation below using the relative rotating speed and "0±α".

Figure 6:
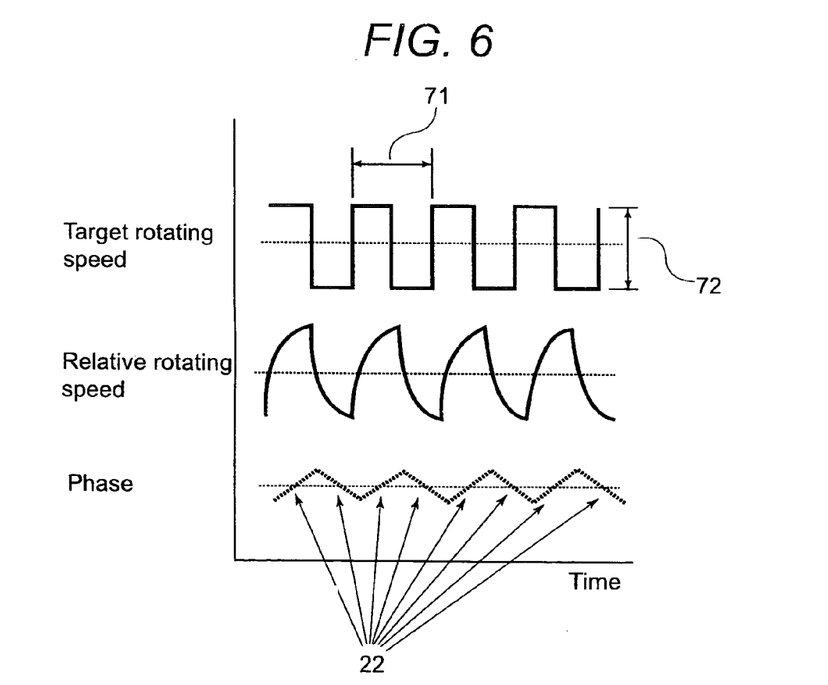
FIG. 6 is a rotating speed and phase waveform of dog clutch.

Target rotating speed=(Input shaft rotating speed−output shaft rotating speed)±α+Output shaft rotating speed Since the crests and roots of gears of the dog clutch are connected with each other as shown in FIG. 2, the gears must be connected in an opposite rotational phase. If the target rotating speed is set as defined by the above equation, the relative rotating speed changes and so the relative rotating position (=phase), which is an integration of the relative rotating speed, can be changed. FIG. 6 shows the phase waveform under this change. As shown in the figure, cross point is as important as torque vibration. Smooth connection can be achieved by generating a number of cross points in an opposite phase. Cross points in an opposite phase can be generated by changing the phase in a range from a position where the crests of the dog clutch correspond to each other via a position where the crest and root correspond to each other and up to a position where the next crests correspond to each other. Accordingly, any relative rotating speed greater than the above is not needed. This means that the rotational vibration period 71 and rotational vibration amplitude 72 shall be set in accordance with the pitch width of the dog clutch teeth.

When the above applies, the rotational vibration period 71 and rotational vibration amplitude 72 shall be so determined that the teeth reciprocate within the pitch width of the dog clutch.

Provided that the target rotating speed is a rectangular waveform as shown in FIG. 6 and the relative rotating speed can response instantly to a change in the target rotating speed, the relative rotating position, which is an integration of the rotating speed, can be obtained by an equation below.

$$p = \text{rev} \cdot t$$

where p: phase rev: relative rotating speed t: period

The rotating speed, however, changes according to the acceleration to be caused by the torque applied to the change in the target rotating speed. Accordingly, the following applied provided that the relative rotating speed is constant:

$$\text{rev} = \alpha \cdot t$$

where

α: rotational vibration acceleration (acceleration torque)

Thus, by controlling the torque of the input shaft side engaging ring 20, using the following equation which is an integration of the above, the amplitude and period of the rotational vibration are determined.

$$p = \tfrac{1}{2} \alpha \cdot t^2$$

In this embodiment, it is important to achieve an opposite phase (a phase where the crest and root correspond to each other) without fail. If the vibration is controlled to start at a phase closer to an opposite phase and move in the direction of an identical phase, it is likely to happen that the vibration does not reach the next opposite phase but the gears vibrate around the identical phase due to instrument and/or control error or mechanical variation.

Accordingly, preferable a and t defined by the above equation will be expressed as:

$$pp < \tfrac{1}{2} \alpha \cdot t^2$$

wherein pp: phase equivalent to the pitch width of the clutch

As explained above, however, any phase in excess of the pitch width is basically unnecessary. Accordingly, setting ½α·t² to a value of 1 to 1.5 times greater than pp will be sufficient.

Similarly in the torque vibration control, the relationship between the applied torque for rotational vibration and vibration frequency is proportional to a curve shown in FIG. 5. In either control, it is understood that the response increases as the vibration control torque is set greater and that the response drops as the frequency is set smaller but the vibration can be controlled with lesser vibration control torque.

If the gear is changed from speed 1 to speed 2 as described above, the gear change can be surely achieved by a device having less connecting force.

While a rotational vibration is applied at the time of engaging the gears, the relative rotating speed between the input shaft 4 and output shaft 5 becomes nearly zero as soon as the connection is complete, and according rotational vibration can no longer be applied. If the rotational vibration continues under this condition, cross point of the torque cannot be generated as explained previously with regard to the torque vibration control at the time of disconnecting the gears. Consequently, there may be a case where the connection teeth do not go into depth and so connection cannot be achieved. Cross point can be generated if such a vibration method that compulsively changes the target rotating speed by time, but the rotational vibration torque is transmitted to the wheel via the output shaft 5, which in turn may cause passengers to feel something unusual, and hence it is not very much recommendable.

In order to solve this problem, starting the torque vibration control immediately after the completion of connection enables to move the tooth face to a sufficient connection position.

Figure 7:
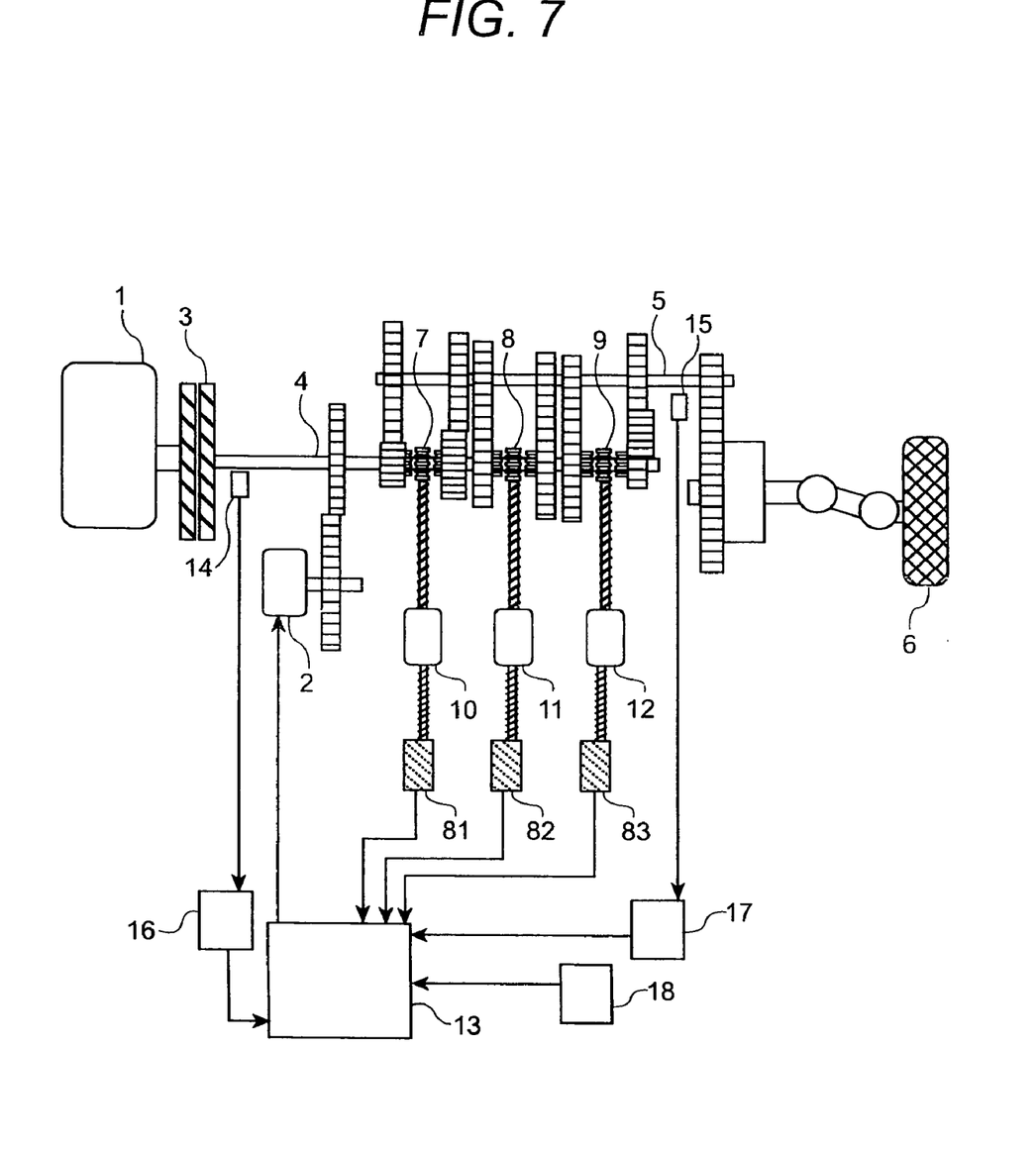
FIG. 7 is a construction and installation of connection position sensor.

When the torque vibration and rotational vibration are applied in combination as explained above, changeover timing is important. The changeover timing, however, can be determined easily if a position sensor is employed for a feedback control of the moving distance of the dog clutch. FIG. 7 shows the construction for this control. The speed 1-2 gear change connection position sensor 81 connected with the position 1-2 gear change connecting force generating device 10 can sense the connection position of the speed 1-2 gear change dog clutch 7. The connection position sensed by the speed 1-2 gear change connection position sensor 81 is inputted to the gear change driving force controller 13. The gear change driving force controller 13 switches the torque vibration control and rotating speed control so as to generate the gear change driving force. At the time of connecting the gears, the rotating speed control is first applied and then, when the gears at the connection position are fully connected, the torque vibration control is applied.

Figure 8:
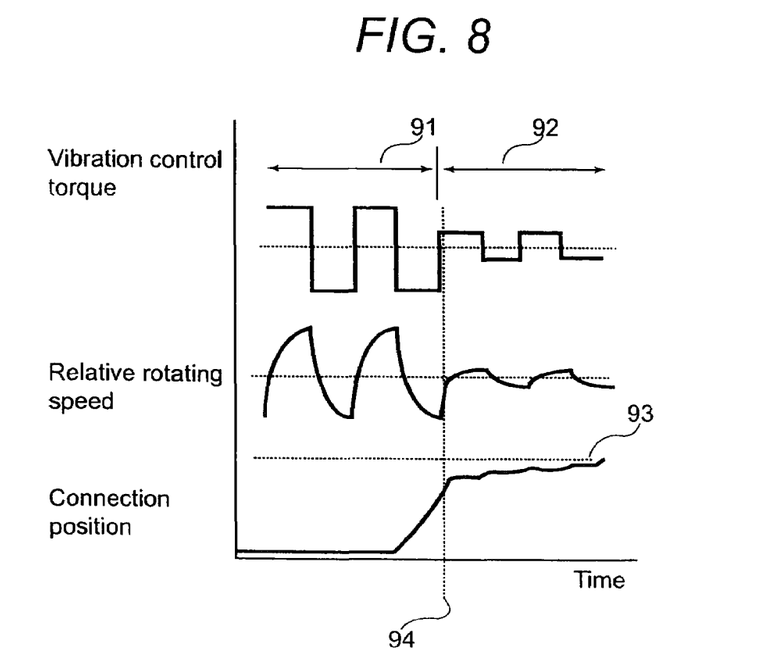
FIG. 8 is a waveform in control changeover.

FIG. 8 shows the torque, rotating speed and waveform at the connection position upon the changeover. The connection position can be moved up to the connection completed position 93 by switching the rotational vibration control area 91 and torque vibration control area 92 at the control changeover timing 94.

The control changeover timing 94 is a timing at which the clutch mechanism has moved to the non-connection distance 95 shown in FIG. 2.

Figure 11:
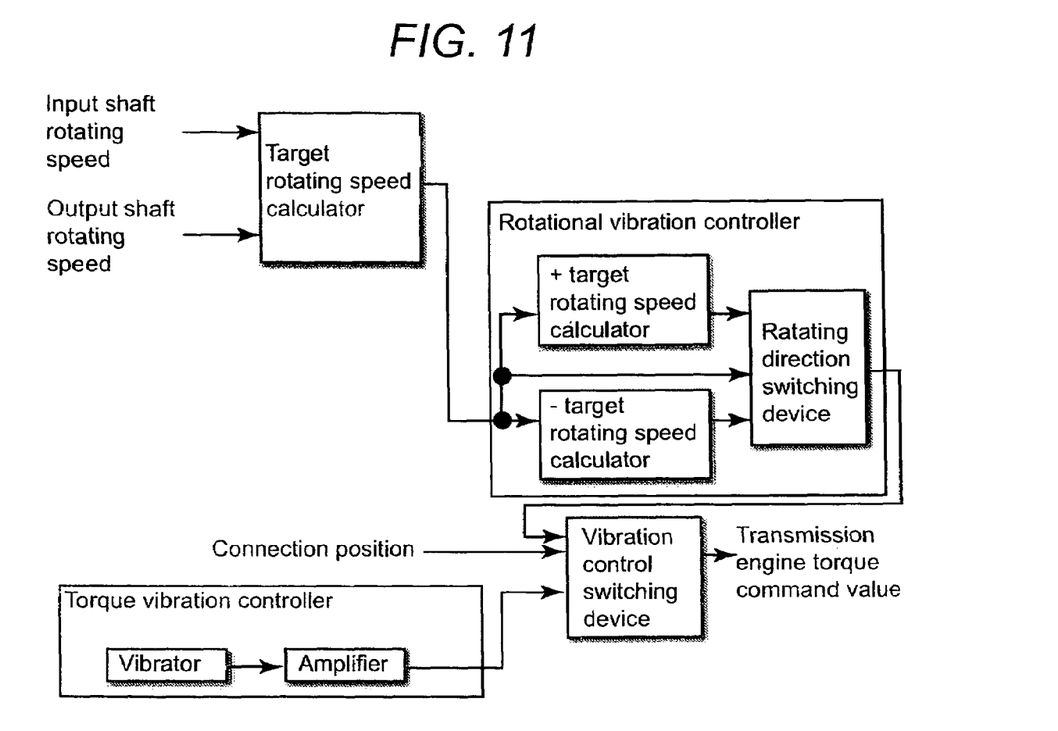
FIG. 11 is a block diagram of shifter equipped with changeover device.

FIG. 11 is a block diagram of the present invention. This function can be either installed in the gear shift driving force controller 13 or provided as a separate device without any problem. With this construction, the rotational vibration control and torque vibration control can be switched as explained above.

Figure 9:
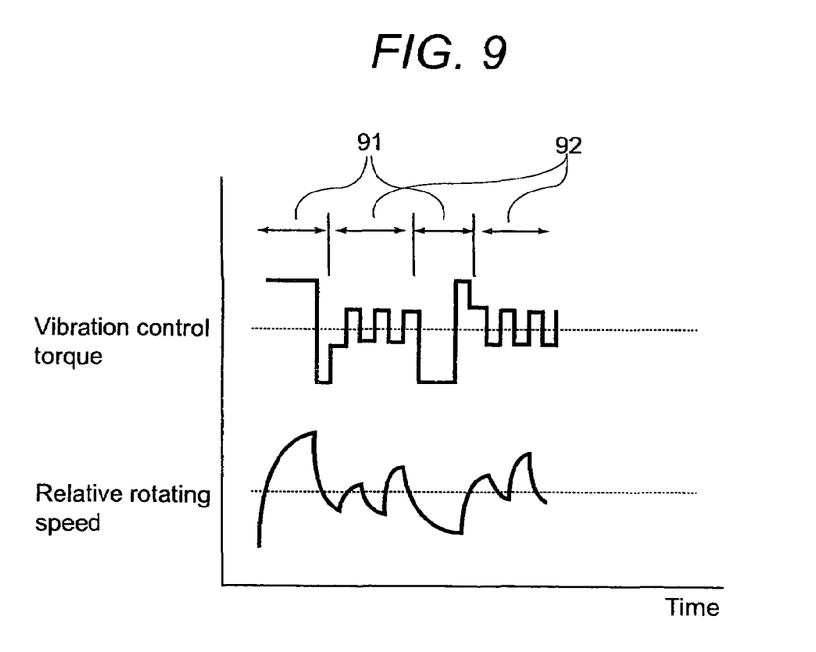
FIG. 9 is a waveform in rotating speed control changeover.

Even in case a connection position sensor cannot be installed, the above switching can be achieved by setting the control changeover timing to a value at a very low relative rotating speed. FIG. 9 shows the control waveform of this control. First, control for applying the rotational vibration is so performed that the phase moves like identical phase→opposite phase→identical phase. If the phase has a change speed, the control can be achieved even with a small control torque. When the gears are connected, the rotating speed is the same and the relative rotating speed becomes closer to zero as explained above. Accordingly, if the relative rotating speed is closer to zero, the phase gradually changed even though the control is switched to the torque vibration control. If they fail to be connected, no rotational control is applied and so the relative rotating speed increases gradually. Accordingly, by switching the control back to the rotating speed control, the relative rotating speed becomes closer to zero again. Cross point can be generated by crossing the above control. Since the connection position is uncertain, the time needed for the connection may become longer than in a system that uses a connection position sensor, but the above changeover control is available without connection position sensor. This function can be either installed in the gear change driving force controller 13 or provided as a separate device without any problem.

The motor 2 of the present invention for applying the driving torque to the input shaft 4 can be substituted by the engine 1. When this applies, the engine 1 is required to have high response but, instead, motor 2 becomes no longer necessary.

The above embodiment comprises a prime mover for driving automobile and a gear shifter containing one input shaft connected with the motor and one output shaft connected with the wheel. This invention, however, is applicable to a gear shifter on which the prime mover for driving automobile and motor have each input shaft as shown in FIG. 10.

Figure 10:
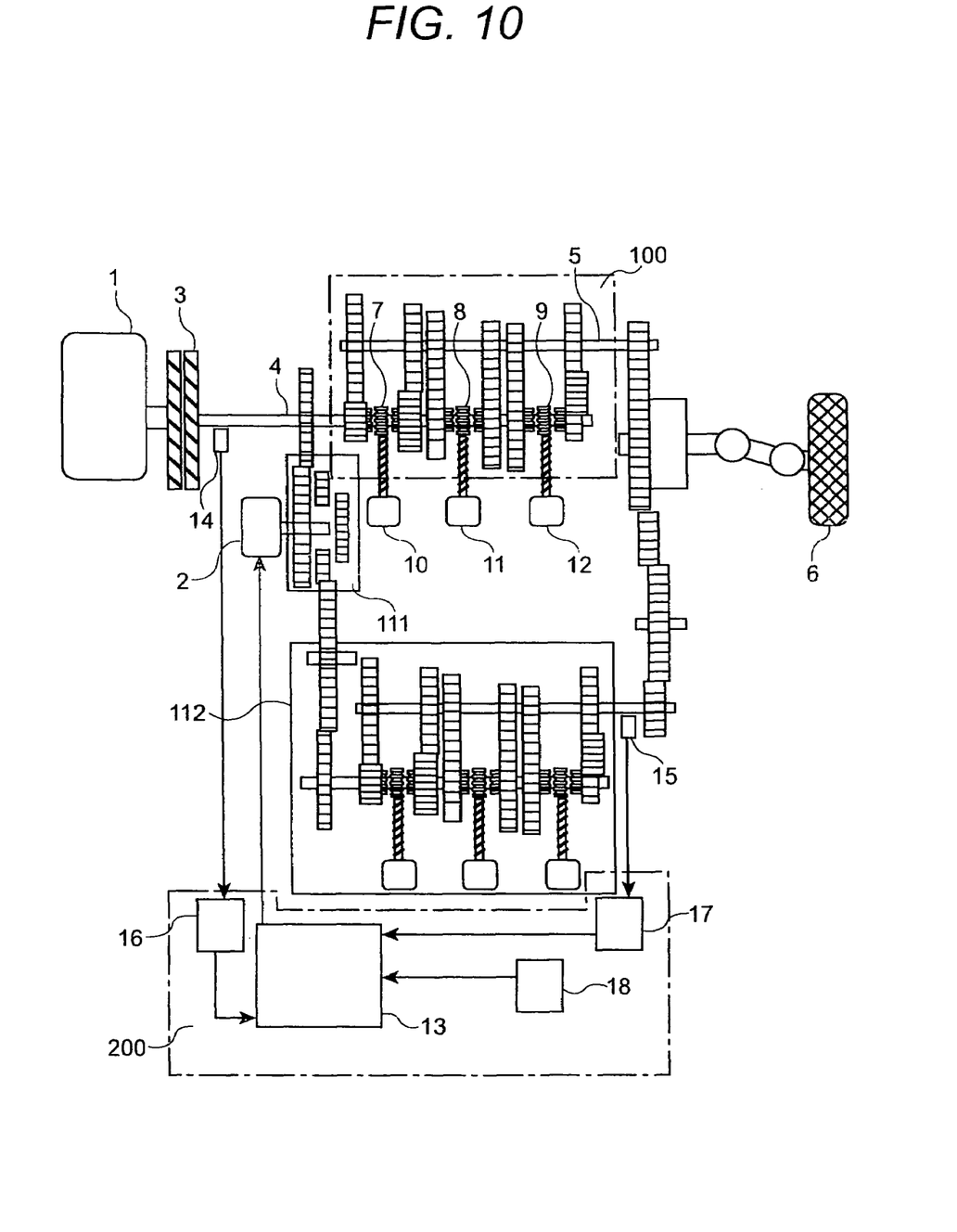
FIG. 10 is an embodiment on multiple-shaft gear shifter.

An embodiment using the gear shifter shown in FIG. 10 is described hereunder. The engine 1 is connected with the input shaft 4 and also connected with the motor 2 via a differential gear 111. The input shaft is connected with the output shaft via the dog clutch. The output shaft connected with the wheel transmits the driving force. The other shaft of the differential gear 111 is connected with the output shaft 5 via an assist drive unit 112. The assist drive unit has a dog clutch inside, and so this construction means in principle that two gear shifting systems having the input shaft and output shaft are installed.

To change from speed 1 to speed 2, the gears of the assist drive unit are connected using the rotational vibration control and the driving force is transmitted from the assist drive unit to the wheel by the motor. Since the wheel is driven by the assist drive unit, the relative torque between the input shaft and output shaft becomes low enough to disconnect the speed-1 gear. Upon the above, the torque vibration control is applied to disconnect the speed-1 gear. Then, the speed-2 gear is connected using the rotational speed control and the driving force transmitted by the assist drive unit is returned to the input shaft by controlling the motor. Since the relative torque of the assist side gear is lower, the gear of the assist drive unit is disconnected using the torque vibration control. Accordingly, twice as much connecting and disconnecting operation as in the above gear shifter is needed in a single gear shift operation.

In a system like the above, the number of connecting and disconnecting actions at the time of gear change is high and so the dog clutch is operated very frequently. Consequently, a need for decreasing energy necessary for connecting and disconnecting the gears is very much higher than in the gear shifter described in the afore-mentioned embodiments. In addition, the invention is effective for making each connecting device smaller and more compact.

Figure 12:
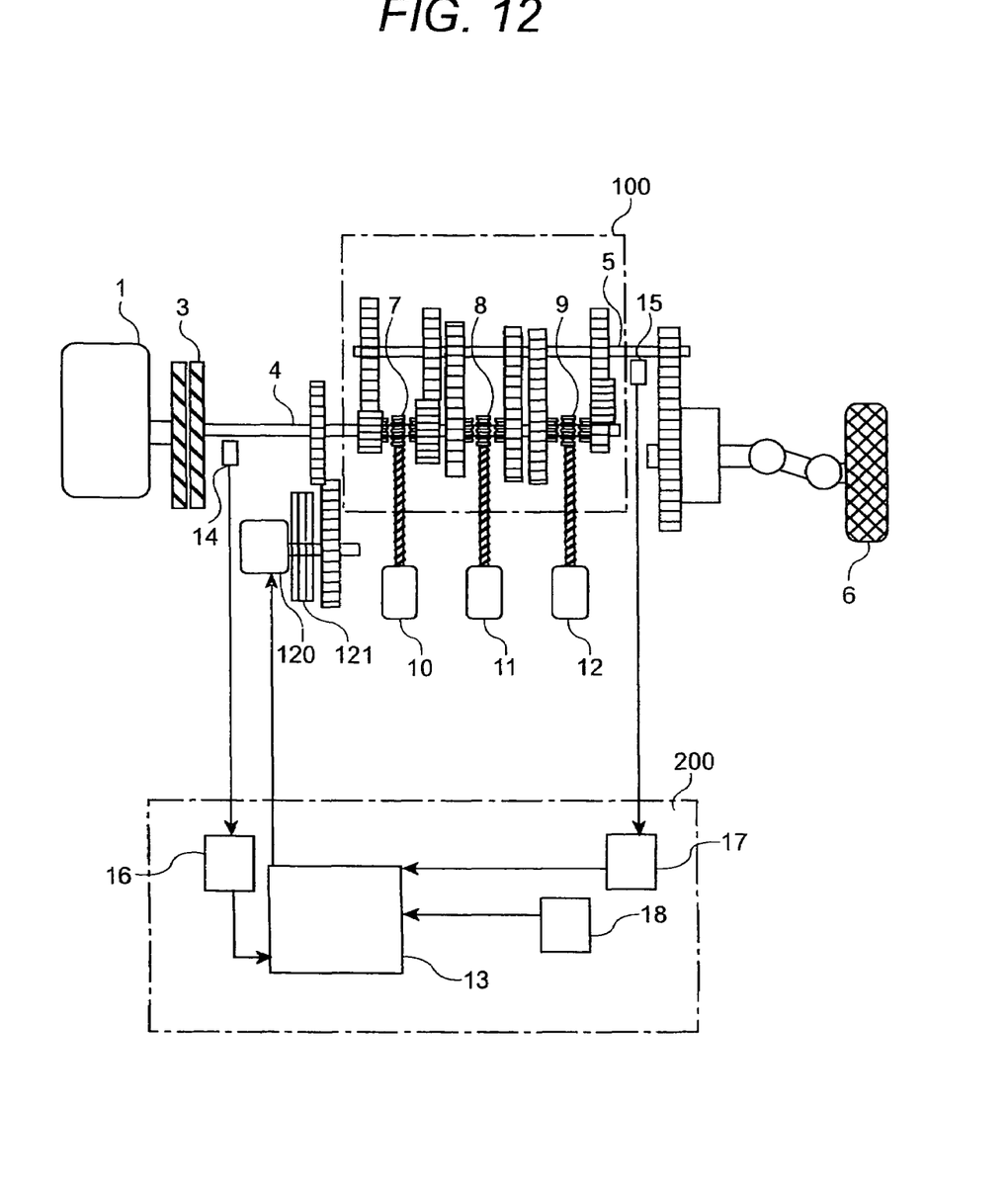
FIG. 12 is an embodiment using multiple disc clutch.

As explained before, the vibration control of this invention can be easily realized by the use of an electric motor. This control, however, can also be realized on a device like multiple disc clutch that generates the transmission torque by means of pressure by vibrating the applied pressure provided that the pressure medium has high response FIG. 12 shows an embodiment that uses a multiple disc clutch. In this embodiment, when pressure generator 120 applies pressure to the multiple disc clutch 121, the clutch is connected and a torque is generated in the direction of stopping the rotation of the input shaft. By vibrating the pressure so as to vibrate the torque, this object can be achieved. Although it seems that no cross point of the relative torque can be generated simply by generating a force in the direction of stopping the rotation, cross points of the relative torque can be generated as follows. When the engine 1 transmits the torque to the input shaft 4, the wheel rotates via the gears and the wheel moves the body of automobile. Accordingly, when it reaches some rotating speed, a torque that keeps the rotation by inertia is generated on the output shaft 5. Thus, applying the vibration to one side of the input shaft 4 so as to lower the torque, that is, to increase/decrease the torque for stopping the rotation will work.

The conception of the above embodiments is summarized as follows.

The target rotating speed Nmdsr of the motor can be expressed by an equation below.

$$Nmdsr = Ne - No*G1.5$$

where
Ne: First input shaft rotating speed
No: Output shaft rotating speed
G1.5: 1.5 speed gear ratio The tip of the dog clutch is chambered on both sides. When the gear connection is repeated, there happens a case one time out of tens of times where the gear dog and sleeve tip cannot be connected in depth from the contact position as shown in FIG. 6 and the connection ended in failure.

The clutch connecting compulsive force Fs applied to the sleeve by the actuator is decomposed into Fcs and Fxs. The tangential force Fa applied from the motor to the differential gear is decomposed into Fca and Fxa. Fxs and Fxs have vector of opposed direction, and the easiness of connection depends upon this difference. The actuator output must be increased to increase Fs, but by decreasing Fa, the connection can be achieved easily without increasing the output. Using the torque applied to this gear, that is, motor torque Tm and radius rg of the gear, Fa can be expressed as follows:

$$Fa = Tm*rg$$

Accordingly, if Tm is made smaller, Fxs−Fxa becomes greater and accordingly the connection can be achieved easily. On the other hand, when contact on the other side chamfer is caused, Tm needs to be increased. However, because sensing the contact position is difficult, and accordingly the direction of applying the torque cannot be defined.

Accordingly, in this embodiment, vibration is applied to the rotating torque. This vibration affects the output shaft but can be defined as a limit acceleration dAcc/dt that cannot be sensed by human body, and expressed as an allowable vibration torque Tdb as below:

$$Tdb = dAcc/dt*9.8*W*r/Gf/Ga$$

where
W: automobile weight
r: wheel radius
Gf: final gear ratio
Ga: second input shaft gear ratio Assuming that the limit acceleration dAcc/dt is 0.05 G, the allowable torque Tdb in this embodiment shall be less than 10 Nm.

Figure 13:
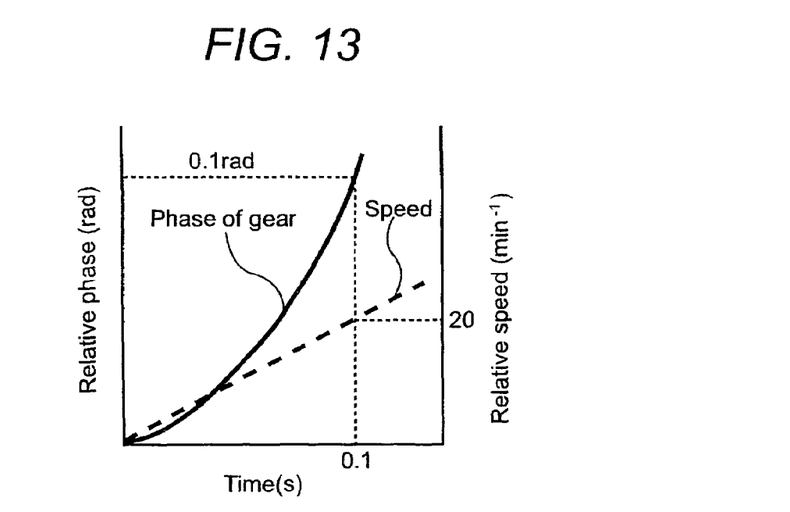
FIG. 13 is a chart showing the relationship between speed and gear phase.

If the rotation amplitude at the time when this vibration torque is applied is kept within the pitch angle of the gear, contact with adjacent tooth due to the change in the rotating position can be eliminated and accordingly, the effect of the vibration upon the output shaft becomes further smaller. Assuming that the vibration torque is 7.5 Nm, the relative rotating angle of the gear changes by 0.1 rad in 0.1 s as shown in FIG. 13. In this embodiment, since the pitch angle of the gear is 0.2 rad, the amplitude of the change is within the pitch angle. By incorporating the torque vibration control as above, gears can be surely engaged.

The embodiments described above are summarized as follows:

Embodiment 1.

A controller for an automotive gear shifter comprising
a prime mover for driving automobile,
input shaft side change gear train connected with the prime mover,
output shaft side change gear train, to be connected with the input shaft side change gear train, fastened on the output shaft connected with a wheel,
dog clutch capable of connecting or disconnecting the input shaft side change gear train or output shaft side change gear train with each shaft,
actuator for connecting and disconnecting the dog clutch,
input shaft rotation sensor for observing the rotating speed of the input shaft,
output shaft rotation sensor for observing the rotating speed of the output shaft, and
gear change power unit, connected with the input shaft, capable of controlling the driving force of the input shaft, wherein
the rotating speed of the gear change power unit is controlled with vibration so that the relative rotating speed between the input side and output side of each dog clutch is reversed from/to positive to/from negative.

Embodiment 2.

A controller for an automotive gear shifter comprising
a prime mover for driving automobile,
input shaft side change gear train connected with the prime mover,
output shaft side change gear train, to be connected with the input shaft side change gear train, fastened on the output shaft connected with a wheel,
dog clutch capable of connecting or disconnecting the input shaft side change gear train or output shaft side change gear train with each shaft,
actuator for connecting and disconnecting the dog clutch,
input shaft rotation sensor for observing the rotating speed of the input shaft,
output shaft rotation sensor for observing the rotating speed of the output shaft, and
gear change power unit, connected with the input shaft, capable of controlling the driving force of the input shaft, wherein
the torque and rotating speed of the gear change power unit are controlled with vibration so that the relative torque between the input side and output side of each dog clutch and relative rotating speed between the input side and output side of each dog clutch are reversed from/to positive to/from negative.

Embodiment 3.

A controller for an automotive gear shifter according to either Embodiment 1 or 2, wherein it is so set that at least either the amplitude and frequency of the torque vibration or amplitude and frequency of the rotational vibration are vibrated within the rotating distance obtained from the mechanical allowance from the prime mover to the wheel.

Embodiment 4.

A controller for an automotive gear shifter according to either Embodiment 1 or 2, wherein it is so set that at least either the amplitude and frequency of the torque vibration or amplitude and frequency of the rotational vibration are vibrated within 150% of the phase obtained from the pitch width of the dog clutch.

Embodiment 5.

A controller for an automotive gear shifter according to either Embodiment 1 or 2, wherein there is provided a connection position sensor for observing the transient state of the dog clutch and the timing to start, stop and switch the torque or rotational vibration control is set in accordance with the reading of the connection position sensor.

Embodiment 6.

A controller for an automotive gear shifter according to either Embodiment 1 or 2, wherein the timing to start, stop and switch the torque or rotating speed vibration control is set in accordance with the relative rotating speed.

Embodiment 7.

A controller for an automotive gear shifter according to either Embodiment 1 or 2, wherein an electric motor is employed as the gear change power generator for the vibration control and the current is controlled with vibration.

Embodiment 8.

A controller for an automotive gear shifter according to either Embodiment 1 or 2, wherein a multiple disc clutch is employed as the gear change power generator for the vibration control and the compression force of the multiple disc clutch is controlled with vibration.

Embodiment 9.

A controller for an automotive gear shifter comprising
a prime mover for driving automobile,
input shaft side change gear train connected with the prime mover,
output shaft side change gear train, to be connected with the input shaft side change gear train, fastened on the output shaft connected with a wheel,
dog clutch capable of connecting or disconnecting the input shaft side change gear train or output shaft side change gear train with each shaft,
actuator for connecting and disconnecting the dog clutch,
input shaft rotation sensor for observing the rotating speed of the input shaft,
output shaft rotation sensor for observing the rotating speed of the output shaft,
differential gear, one rotating shaft of which is connected with the input shaft,
gear change power unit connected with another rotating shaft of the differential gear,
change gear train of an assist input shaft connected with another rotating shaft of the differential gear,
output shaft side change gear train coupled with the assist input shaft side change gear train and fastened on the output shaft connected with the wheel, and
dog clutch capable of connecting or disconnecting the assist input shaft side change gear train or output shaft side change gear train with each shaft, wherein
the torque and rotating speed of the gear change power unit are controlled with vibration so that the relative torque between the input side and output side of each dog clutch and relative rotating speed between the input side and output side of each dog clutch are reversed from/to positive to/from negative.

Embodiment 10.

A controller for an automotive gear shifter according to Embodiment 9, wherein it is so set that at least either the amplitude and frequency of the torque vibration or amplitude and frequency of the rotational vibration are vibrated within the rotating distance obtained from the mechanical allowance from the prime mover to the wheel.

Embodiment 11.

A controller for an automotive gear shifter according to Embodiment 9, wherein it is so set that at least either the amplitude and frequency of the torque vibration or amplitude and frequency of the rotational vibration are vibrated within 150% of the phase obtained from the pitch width of the dog clutch.

Embodiment 12.

A controller for an automotive gear shifter according to Embodiment 9, wherein there is provided a connection position sensor for observing the transient state of the dog clutch and the timing to start, stop and switch the torque or rotational vibration control is set in accordance with the reading of the connection position sensor.

Embodiment 13.

A controller for an automotive gear shifter according to Embodiment 9, wherein the timing to start, stop and switch the torque or rotating speed vibration control is set in accordance with the relative rotating speed.

Embodiment 14.

A controller for an automotive gear shifter according to Embodiment 9, wherein an electric motor is employed as the gear change power generator for the vibration control and the current is controlled with vibration.

Embodiment 15.

A controller for an automotive gear shifter according to Embodiment 9, wherein a multiple disc clutch is employed as the gear change power generator for the vibration control and the compression force of the multiple disc clutch is controlled with vibration.

Embodiment 16.

An actuator controller for an automotive gear shifter for changing the driving torque from prime mover and transmitting it to wheel by selectively shifting multiple change gear trains of different number of teeth by operating a dog clutch, outputting control signal to an actuator for operating the dog clutch and to a driving torque supplementary device for supplementing the drive torque between the input shaft and output shaft of the gear shifter during the gear change by the gear shifter, wherein the controller sends our periodically variable control signal to the drive torque supplementary device in synchronization with the timing of outputting control signal to the actuator for operating the dog clutch.

What is claimed is:

1. An automotive gear shifter for changing the driving torque from a prime mover and transmitting it to a wheel by selectively shifting multiple steps of change gear trains of different change ratios installed between an input shaft and an output shaft of the gear shifter, an input side element of a dog clutch being disconnected from an output side element of the dog clutch provided on the change gear train of a specified step by operating the dog clutch and then connected with the output side element of the dog clutch provided on the change gear train of another step,
wherein there is provided a disconnection/connection adjuster that applies at least one of periodic torque variation and periodic rotating speed variation relatively between the input side element and output side element of the dog clutch in synchronization with the disconnection timing or connection timing between the input side element and output side element of the dog clutch at the time of gear change.

2. An automotive gear shifter according to claim 1, wherein the disconnection/connection adjuster, after the input side element and output side element of the dog clutch are disconnected, also applies periodic rotating speed variation relatively between the input side element and another output side element of the dog clutch.

3. An automotive gear shifter according to claim 1, wherein the disconnection/connection adjuster, comprising a motor and a torque transmission device for transmitting the rotating torque of the motor, applies at least one of the periodic torque variation and rotating speed variation from the motor.

4. An automotive gear shifter for changing the driving torque from a prime mover and transmitting it to a wheel by selectively shifting multiple steps of change gear trains of different change ratios installed between an input shaft and an output shaft of the gear shifter, comprising a gear shifting device in which an input side element of a dog clutch is disconnected from an output side element of the dog clutch provided on a change gear train of a specified step by operating the dog clutch and then connected with the output side element of the dog clutch provided on a change gear train of another step and a clutch mechanism that disconnects the torque transmission path between the input shaft and the prime mover at the timing of gear change, wherein there is provided a torque assist device that supplies an assist torque to the input shaft during the gear change period between the input side element and output side element of the dog clutch at the time of gear change, and the torque assist device applies at least one of periodic torque variation and periodic rotating speed variation relatively between the input side element and output side element of the dog clutch in synchronization with the disconnection timing or connection timing between the input side element and output side element of the dog clutch.

5. An automotive gear shifter according to claim 4, wherein the torque assist device applies periodic torque variation relatively between the input side element and output side element of the dog clutch in synchronization with the disconnection timing between the input side element and output side element of the dog clutch and, after the input side element and output side element of the dog clutch are disconnected, also applies periodic rotating speed variation relatively between the input side element and output side element of another dog clutch.

6. An automotive gear shifter according to claim 4, wherein the torque assist device comprises a motor.

* * * * *